United States Patent
Marteaux et al.

(10) Patent No.: US 6,878,773 B2
(45) Date of Patent: Apr. 12, 2005

(54) SILICONE POLYMER EMULSIONS

(75) Inventors: Leon Andre Marteaux, Brussels (BE); Anne-Lise Girboux, Braine l'Alleud (BE)

(73) Assignee: Dow Corning S.A., Seneffe (BE)

( * ) Notice: Subject to any disclaimer, the term of this patent is extended or adjusted under 35 U.S.C. 154(b) by 0 days.

(21) Appl. No.: 10/204,932

(22) PCT Filed: Jan. 30, 2001

(86) PCT No.: PCT/EP01/00977
§ 371 (c)(1),
(2), (4) Date: Aug. 5, 2002

(87) PCT Pub. No.: WO01/58986
PCT Pub. Date: Aug. 16, 2001

(65) Prior Publication Data
US 2003/0040572 A1 Feb. 27, 2003

(30) Foreign Application Priority Data
Feb. 11, 2000 (GB) .............................. 0003061

(51) Int. Cl.$^7$ .............................. C08L 83/10
(52) U.S. Cl. ...................... 524/837; 524/588; 524/860; 524/861; 524/862; 525/100; 525/106
(58) Field of Search ................... 524/837, 588, 524/860, 861, 862; 525/100, 106

(56) References Cited

U.S. PATENT DOCUMENTS

| | | | | |
|---|---|---|---|---|
| 4,122,029 A | * | 10/1978 | Gee et al. ...................... 516/23 |
| 4,150,048 A | * | 4/1979 | Schilling et al. ............. 556/444 |
| 4,962,165 A | | 10/1990 | Bortnick et al. | |
| 5,405,691 A | * | 4/1995 | Noda et al. .................. 428/331 |
| 5,493,041 A | | 2/1996 | Biggs et al. | |
| 5,731,379 A | * | 3/1998 | Kennan et al. .............. 524/806 |
| 5,741,859 A | * | 4/1998 | Saxena et al. ............... 525/106 |
| 5,811,487 A | | 9/1998 | Schulz, Jr. et al. | |
| 5,889,108 A | | 3/1999 | Zhang | |
| 5,908,951 A | * | 6/1999 | Kobayashi et al. .......... 556/479 |
| 5,973,068 A | * | 10/1999 | Yamaya et al. .............. 524/865 |
| 6,005,051 A | * | 12/1999 | Kennedy et al. ............. 525/106 |
| 6,013,682 A | | 1/2000 | Dalle et al. | |
| 6,040,383 A | | 3/2000 | Dauth et al. | |
| 6,057,386 A | | 5/2000 | Morita et al. | |
| 6,306,411 B1 | | 10/2001 | Jager-Lezer | |

\* cited by examiner

*Primary Examiner*—Jeffrey B. Robertson
(74) *Attorney, Agent, or Firm*—Alan Zombeck

(57) ABSTRACT

In a process for the preparation of an emulsion of a silicone organic block copolymer in water, a polydiorganosiloxane having terminal reactive groups (A), an organic material having terminal groups (B) which are reactive with the groups (A) and a catalyst are emulsified in water with a surfactant and the resulting emulsion is subjected to conditions under which the reaction between groups (A) and (B) proceeds in the presence of the catalyst, thereby forming a copolymer chain containing polysiloxane blocks and blocks of organic material. Preferred emulsions comprise a copolymer comprising polydiorganosiloxane blocks and organic blocks, having a viscosity in the range 10 to 1000000 Pa.s and a mean particle size of 0.3 to 1000 micrometers.

9 Claims, No Drawings

SILICONE POLYMER EMULSIONS

FIELD OF THE INVENTION

This invention relates to silicone in water emulsions and to methods of making them.

BACKGROUND OF THE INVENTION

U.S. Pat. No. 6,013,682-A describes a method of making a silicone in water emulsion comprising mixing (I) a composition containing at least one polysiloxane, at least one organosilicon material that reacts with said polysiloxane by a chain extension reaction and a metal containing catalyst for said chain extension reaction, (II) at least one surfactant and (III) water to form a mixture; and emulsifying the mixture.

U.S. Pat. No. 5,973,068-A describes emulsion polymerizing a silanol-terminated resin and a vinyl monomer. Polymerization in the emulsion polymerization process occurs at the silicone water interface so that the rate of polymerization is faster with smaller particles because of the larger surface area. Thus, it is impossible to produce large particle size, high molecular weight silicone gum in water emulsions by emulsion polymerisation.

U.S. Pat. No. 5,731,379-A describes copolymerisation of an acrylate-terminated polydimethylsiloxane and an acrylate-terminated polyisobutylene by free radical polymerisation. EP 872509-A describes reaction of an acrylate-terminated polydimethylsiloxane with an amine-terminated polyisobutylene.

U.S. Pat. No. 4,962,165-A describes the reaction of an organohydrogen-polysiloxane with a multifunctional unsaturated monomer having unsaturated groups of different relativities such as allyl methacrylate. The allyl group reacts with Si—H groups and the methacrylate group subsequently undergoes free radical polymerisation.

SUMMARY OF THE INVENTION

In a process according to one aspect of the present invention for the preparation of an emulsion of a silicone organic block copolymer in water, a polydiorganosiloxane having terminal reactive groups (A), an organic material having terminal groups (B) which are reactive with the groups (A) and a catalyst are mixed and then emulsified in water with a surfactant and the resulting emulsion is subjected to conditions under which the reaction between groups (A) and (B) proceeds in the presence of the catalyst, thereby forming a copolymer chain containing polysiloxane blocks and blocks of organic material.

In a process according to another aspect of the invention for the preparation of an emulsion of a silicone organic block copolymer in water, a polydiorganosiloxane having terminal Si—H groups (A), an organic material having terminal aliphatically unsaturated groups (B) which are reactive with the Si—H groups (A) and a catalyst are emulsified in water with a surfactant and the resulting emulsion is subjected to conditions under which the reaction between groups (A) and (B) proceeds in the presence of the catalyst, thereby forming a copolymer chain containing polysiloxane blocks and blocks of organic material.

The emulsions produced by the process of this invention can have a wide variety of silicone copolymer concentrations, particle sizes and molecular weights, including novel materials having high concentrations of large particle silicone copolymer of high molecular weight. Moreover, the process results in emulsions in which the particle size and the molecular weight of the silicone inside the droplets are independent parameters. The particle size can for example be chosen within the range 0.1 to 1000 micrometres.

A novel emulsion of a silicone organic copolymer in water according to a further aspect of the present invention is characterised in that the copolymer comprises polydiorganosiloxane blocks and organic blocks and has a dynamic viscosity at 0.01 Hz in the range 10 to 1000000 Pas and a mean particle size of 0.3 to 1000 micrometers. The silicone emulsion copolymer preferably has dynamic viscosity of at least 1000 Pa.s. Such high viscosities have to be measured as dynamic viscosity rather than flow viscosity, and are measured at a low frequency such as 0.01 Hz because this has been found for less viscous silicones to correspond well to flow viscosity.

DETAILED DESCRIPTION

The terminal reactive groups (A) in the polydiorganosiloxane are preferably Si—H groups which can react with an aliphatically unsaturated group in the presence of a platinum or rhodium containing catalyst. The polydiorganosiloxane is generally a substantially linear polymer and preferably has the structure:

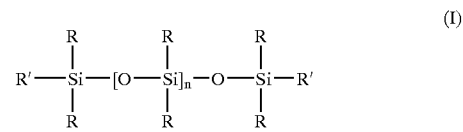

(I)

where R represents a hydrocarbon group having up to 20 carbon atoms such as an alkyl (e.g., methyl, ethyl, propyl or butyl), or aryl (e.g., phenyl) group and R' represents the group required for the chain extension reaction with the organic material, for example hydrogen bonded to silica; and n is an integer greater than 1. The group R' can alternatively contain a reactive organic group, for example it can be an aliphatically unsaturated group such as vinyl, allyl or hexenyl or an aminoalkyl group. Preferably there is on average between one and two reactive groups (inclusive) per polymer, most preferably two groups or just less. Preferably, a majority, more preferably over 90%, and most preferably over 98% of the reactive groups are end-groups R' as shown. Preferably n is an integer such that the polydiorganosiloxane has a viscosity between 1 and $1 \times 10^6$ mm$^2$/sec at 25° C.

If desired, the polydiorganosiloxane can have a small amount of branching (e.g., less than 2 mole % of the siloxane units) without affecting the invention, i.e., the polymers are 'substantially linear'. The groups R are usually hydrocarbyl groups, for example alkyl or aryl groups; preferably at least 80% of the R groups are alkyl groups, more preferably methyl groups. If desired, R groups can be substituted with, for instance, oxygen containing groups such as epoxy or alcohol groups.

The organic material reacts with the polysiloxane by a chain extension reaction and can be either a polymer or a non-polymeric material that acts as a chain extension agent. The terminal reactive groups (B) of the organic material are preferably aliphatically unsaturated groups, for example vinyl or allyl groups. The organic material is preferably a polymer having a backbone of carbon—carbon bonds, for example an addition polymer. Polymers whose repeating units have electron donor characteristics are particularly preferred, for example polyisobutylene having terminal unsaturation such as diallyl-endblocked polyisobutylenes, which are available commercially with various chain lengths. Polyisobutylenes of molecular weight in the range 1000 to 50000, preferably 2000 to 20000, can for example be used. The polymer can alternatively contain linkages comprising a heteroatom such as O or N, for example ether, ester, amide, imide or urethane linkages. Examples of such polymers are polyoxyalkylene glycols etherified with an unsaturated group, such as polyethylene glycol divinyl ether, or an acrylate or methacrylate polymer such as a urethane acrylate.

A non-polymeric organic material for use in the process of the invention can for example be a non-conjugated diene, preferably an alpha, omega-diene having 6 to 30 carbon atoms such as 1,5-hexadiene or 1,7-octadiene. The diene can have more than 30 carbon atoms but is preferably liquid. Alternatively compounds containing two vinyl or allyl groups can be used, for example diallyl ether, diallyl amine, diallyl carbonate, diallyl phthalate, diallyl succinate, 1,3-diallyl urea, allyl methacrylate, propylene glycol divinyl ether or tetraethylene glycol divinyl ether.

The organic material (B) can alternatively comprise a material having three reactive groups (B), e.g. three aliphatically unsaturated groups. This will lead to a branched or 3-limbed polymer, but it is generally preferred to use a difunctional organic material to produce an emulsion of a linear copolymer.

The catalyst is preferably a metal-containing catalyst of a type known for chain extension reactions of siloxanes, for example a material containing a metal such as platinum, rhodium, tin, titanium, copper or lead. A hydrosilylation catalyst for the reaction of an organosilicon material having Si—H groups and an organic material having aliphatically unsaturated groups can be, for example, a platinum or rhodium containing material. These catalysts may take the form of platinum or rhodium deposited on a carrier such as silica gel or powdered charcoal, or a platinum or rhodium salt or compound such as platinic chloride or chloroplatinic acid or a platinum or rhodium complex. Catalysts comprising $Pt^{IV}$, for example platinic chloride or chloroplatinic acid, or a complex prepared from chloroplatinic acid hexahydrate and divinyltetramethyldisiloxane, are particularly preferred. Generally, the catalyst is used at between 0.0001 and 10 wt. % based on the weight of the polydiorganosiloxane.

The surfactant can in general be a non-ionic surfactant, a cationic surfactant, an anionic surfactant or an amphoteric surfactant, although not all procedures for carrying out the process of the invention can be used with all surfactants. The amount of surfactant used will vary depending on the surfactant, but generally is between 1 and 30 wt. % based on the polydiorganosiloxane.

Examples of non-ionic surfactants include polyoxyalkylene alkyl ethers such as polyethylene glycol long chain (12–14C) alkyl ether, polyoxyalkylene sorbitan ethers, polyoxyalkylene alkoxylate esters, polyoxyalkylene alkylphenol ethers, ethylene glycol propylene glycol copolymers and alkylpolysaccharides, for example materials of the structure $R^1$—O—$(R^2O)_m$—$(G)_n$ wherein $R^1$ represents a linear or branched alkyl group, a linear or branched alkenyl group or an alkylphenyl group, $R^2$ represents an alkylene group, G represents a reduced sugar, m denotes 0 or a positive integer and n represents a positive integer as described in U.S. Pat. No. 5,035,832.

Examples of cationic surfactants include quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, quaternary ammonium bases of benzimidazolines and polypropanolpolyethanol amines.

Examples of suitable anionic surfactants include alkyl sulfates such as lauryl sulfate, polymers such as acrylates/ $C_{10-30}$ alkyl acrylate crosspolymer alkylbenzenesulfonic acids and salts such as hexylbenzenesulfonic acid, octylbenzenesulfonic acid, decylbenzenesulfonic acid, dodecylbenzenesulfonic acid, cetylbenzenesulfonic acid and myristylbenzenesulfonic acid; the sulfate esters of monoalkyl polyoxyethylene ethers; alkylnapthylsulfonic acid; alkali metal sulforecinates, sulfonated glyceryl esters of fatty acids such as sulfonated monoglycerides of coconut oil acids, salts of sulfonated monovalent alcohol esters, amides of amino sulfonic acids, sulfonated products of fatty acid nitriles, sulfonated aromatic hydrocarbons, condensation products of naphthalene sulfonic acids with formaldehyde, sodium octahydroanthracene sulfonate, alkali metal alkyl sulfates, ester sulfates, and alkarylsulfonates.

Examples of suitable amphoteric surfactants include cocamidopropyl betaine, cocamidopropyl hydroxysulfate, cocobetaine, sodium cocoamidoacetate, cocodimethyl betaine, N-coco-3-aminobutyric acid and imidazolinium carboxyl compounds.

The above surfactants may be used individually or in combination.

In one preferred process according to the invention, the polydiorganosiloxane, the organic material, the catalyst and the surfactant are mixed and are emulsified in water.

The polydiorganosiloxane, the organic material, the catalyst and the surfactant can be mixed all at once or these materials can be mixed in any order. However when the polydiorganosiloxane, the organic material and the catalyst are combined, the polymerisation reaction begins. As such, it may be preferred to mix one of these components of the composition last. For example, it may be preferred to premix the metal containing catalyst, the organic material and the surfactant before mixing with the polysiloxane. Anionic surfactants may increase the kinetics of the chain extension reaction between a polydiorganosiloxane having at least one Si—H group and an aliphatically unsaturated organic material in the presence of a hydrosilylation catalyst. The unsaturated organic material can be premixed with the catalyst and then mixed in a mixture of the anionic surfactant and the polydiorganosiloxane (i.e., the Si—H material). Alternatively, a cure inhibitor could be added to control the reaction kinetics.

The polydiorganosiloxane, organic material, catalyst and surfactant can be premixed with other materials which do not inhibit polymerisation, for example a solvent, plasticiser or filler. Such a material is preferably lipophilic, that is it should have more affinity for the siloxane and the organic material than for water. The organic material and/or siloxane can be premixed with a hydrocarbon solvent, for example toluene, before contacting the surfactant to inhibit interaction with water. A non-reactive silicone resin, for example a MQ resin comprising triorganosilyl units and $SiO_{4/2}$ units and/or a hydrophobic filler, for example a treated silica, can be premixed with the polydiorganosiloxane. A lipophilic active material such as a perfume, sunscreen or pharmaceutical additive can be premixed with the organic material and/or the siloxane and will be carried by the oil phase of the copolymer emulsion so that it is deposited with the copolymer, for example on hair from a shampoo.

The resulting mixture can be mixed with water by simple agitation to form a coarse water in oil mixture. This mixture is then emulsified. During emulsification, the coarse water in oil mixture is inverted into a fine silicone in water emulsion. After inversion, the chain extension reaction continues within the silicone droplet until all the materials have reacted or the reaction has been inhibited. The emulsification can be accomplished by conventional means such as a batch mixer, colloid mill or line mixer. The emulsification process is simple and fast, and this procedure can be used with any type of surfactant.

The quantity of water and/or surfactant used in the initial phase inversion process may have an impact on the particle size of the final emulsion. For instance, if an emulsion is formed with the same quantity of water in two instances but in the first a large quantity of water is mixed before the phase inversion step and in the second a small quantity of water is mixed before the phase inversion step followed by mixing the remaining additional water after the phase inversion step, the first emulsion will generally have a larger particle size than the second. No matter how the water is added, the total amount of water used is generally between about 1 and 99 wt. %, preferably between about 6 and about 99 wt. %, based on the weight of the emulsion.

Polymerisation in the above procedure takes place at the interior of the oil droplets by chain extension (i.e., not at the oil/water interface). The degree of polymerisation is not controlled by droplet size, but by the ratio of materials used in the chain extension reaction. This allows for the production of a broad range of monodisperse droplet sizes containing polysiloxanes with a high viscosity and, if required, emulsions with high silicone volume fractions.

In an alternative procedure according to the invention, the polydiorganosiloxane and the organic material are emulsified in water with a surfactant and the catalyst is added to the emulsion. A nonionic surfactant is preferred for this process since the presence of ionic surfactant in the aqueous phase inhibits the catalysis of the hydrosilylation reaction by metal-containing catalysts such as PtIV compounds.

In a third procedure according to the invention, the polydiorganosiloxane and the organic material are emulsified in water with an anionic, cationic or amphoteric surfactant and the catalyst is dispersed in a nonionic surfactant before being added to the emulsion. The catalyst can simply be mixed with the nonionic surfactant and added to the emulsion or the catalyst and nonionic surfactant can be premixed with water before being added. Mixing with the nonionic surfactant avoids inhibition of the catalyst by the ionic surfactant. The amount of nonionic surfactant used is preferably 0.1–10 parts per volume per part of a commercial platinum catalyst preparation (about 2–200 parts by weight per part of platinum in the catalyst). This procedure is useful in preparing a silicone copolymer emulsion based on an anionic, amphoteric or cationic surfactant, for example for inclusion in a personal care product such as a shampoo based on the same type of surfactant.

If desired, other materials can be added to either phase of the emulsions, for example perfumes, colorants, thickeners, preservatives, plasticisers or active ingredients such as pharmaceuticals.

The emulsions of the present invention can generally have a silicone loading in the range of about 1 to about 94 wt. %. The molecular weight of the silicone can be in the range of that corresponding to a bulk viscosity of about 1 mm$^2$/sec at 25° C. to in excess of $10^8$ mm$^2$/sec at 25° C., most preferably $10^6$ to $10^8$ mm$^2$/sec. (1000–100000 Pa.s.). The mean particle size of the emulsion is preferably from 0.1 to 1000 micrometers, more preferably about 0.3 to 100 micrometers. The emulsions of the invention render the high molecular weight silicone in the droplets easily handleable.

The emulsions of the invention are useful in most known applications for silicone emulsions, for example in personal care applications such as on hair, skin, mucous membrane or teeth. In these applications, the silicone is lubricious and will improve the properties of skin creams, skin care lotions, moisturisers, facial treatments such as acne or wrinkle removers, personal and facial cleansers, bath oils, perfumes, fragrances, colognes, sachets, sunscreens, pre-shave and after shave lotions, shaving soaps and shaving lathers. It can likewise be use in hair shampoos, hair conditioners, hair sprays, mousses, permanents, depilatories, and cuticle coats, for example to provide styling and conditioning benefits. In cosmetics, it functions as a levelling and spreading agent for pigment in make-ups, colour cosmetics, foundations, blushes, lipsticks, eye liners, mascaras, oil removers, colour cosmetic removers and powders. It is likewise useful as a delivery system for oil and water soluble substances such as vitamins, organic sunscreens, ceramides, pharmaceuticals and the like. When compounded into sticks, gels, lotions aerosols and roll-ons, the emulsions of this invention impart a dry silky-smooth payout.

When used in personal care products, they are generally incorporated in amounts of about 0.01 to about 50 weight percent, preferably 0.1 to 25 wt. percent, of the personal care product. They are added to conventional ingredients for the personal care product chosen. Thus, they can be mixed with deposition polymers, surfactants, detergents, antibacterials, anti-dandruffs, foam boosters, proteins, moisturising agents, suspending agents, opacifiers, perfumes, colouring agents, plant extracts, polymers, and other conventional care ingredients.

Beyond personal care, the emulsions of the invention are useful for numerous other applications such as textile fibre treatment, leather lubrication, fabric softening, release agents, water based coatings, oil drag reduction, particularly in crude oil pipelines, lubrication, facilitation of cutting cellulose materials, and in many other areas where silicones are conventionally used. The silicone organic copolymers have particular advantages in oil drag reduction resulting from increased compatibility with hydrocarbon fluids.

The following Examples are provided so that one skilled in the art will more readily understand the invention. Unless otherwise indicated, all parts and percents are by weight and all viscosities are at 25° C.

EXAMPLE 1

25 parts of a Si—H terminated polydimethylsiloxane having a viscosity of 60000 mm$^2$/sec was mixed with 2.5 parts "Kaneka Epion 200A" (Trade Mark) allyl end blocked polyisobutylene of molecular weight 5000 and then stirred with 0.35 parts Pt$^{IV}$ catalyst (a chloroplatinic acid complex containing 4% platinum). 1.7 parts "Laureth 23" and 1.25 parts "Laureth-3" (nonionic polyethylene glycol lauryl ether surfactants of different chain lengths) were stirred in and 1 part water was added with stirring to invert the mixture to an oil-in water emulsion. The emulsion was diluted with a further 15 parts water and heated at 80° C. for 3 hours to effect chain extension polymerisation of the Si—H polymer and the polyisobutylene.

The emulsion produced contained a linear silicone organic copolymer of dynamic viscosity 8500 Pa.s at 0.01 Hz.

EXAMPLE 2

25 parts Si—H terminated polysiloxane, 2.5 parts allyl-terminated polyisobutylene and 0.35 parts catalyst were mixed as described in Example 1. 0.89 parts "Renex 30" (Trade Mark) polyethylene glycol tridecyl ether nonionic surfactant was added with stirring followed by 2 parts water to form an oil-in-water emulsion. 1.33 parts sodium lauryl ether sulphate anionic surfactant was stirred in and the emulsion was diluted with 15 parts water. Polymerisation was carried out at 80° C. for 3 hours.

The emulsion produced contained a linear silicone organic copolymer of dynamic viscosity 32300 Pas at 0.01 Hz.

EXAMPLES 3 TO 6

The procedure of Example 1 was followed using the Si—H terminated polydimethylsiloxanes and allyl-terminated polyisobutylenes listed in the Table below (Epion 400A is believed to have molecular weight about 10000), except that the amount of water added to dilute the emulsion was 22 parts in each Example.

|  | Si-H polymer Viscosity | Polyisobutylene | Viscosity of copolymer |
| --- | --- | --- | --- |
| Example 3 | 12500 cPs | 400A | not measured |
| Example 4 | 12500 cPs | 200A | 3400 Pa.s |
| Example 5 | 110000 cPs | 400A | 3350 Pa.s |
| Example 6 | 110000 cPs | 400A | 2460 Pa.s |

The viscosity quoted is the dynamic viscosity of the copolymer at 0.01 Hz.

EXAMPLE 7

2.6 g "Epion 200A" allyl-endblocked polyisobutylene was diluted with 1.3 g toluene and mixed with 0.05 g of the catalyst of Example 1 and then with 23.0 g Si—H terminated polydimethylsiloxane of viscosity 15000 cPs. Surfactants and water were stirred in as described in Example 1 to form an oil-in-water emulsion which was diluted and polymerised at 60° C. for 3 hours to form a copolymer of molecular weight 640000 as measured by gas permeation chromatography (GPC).

What is claimed is:

1. A process for the preparation of an emulsion of a silicone organic block copolymer in water, characterised in that a polydiorganosiloxane having terminal reactive groups (A), an organic material having terminal groups (B) which are reactive with the groups (A) and a catalyst are mixed and then emulsified in water with a surfactant to form an emulsion and the resulting emulsion is subjected to conditions under which the reaction between groups (A) and (B) proceeds in the presence of the catalyst, thereby forming a copolymer chain containing polysiloxane blocks and blocks of organic material.

2. A process for the preparation of an emulsion of a silicone organic block copolymer in water as claimed in claim 1, further characterised in that a polydiorganosiloxane having terminal Si—H groups (A), an organic material having terminal aliphatically unsaturated groups (B) which are reactive with the Si—H groups (A) and a catalyst are emulsified in water with a surfactant to form an emulsion and the resulting emulsion is subjected to conditions under which the reaction between groups (A) and (B) proceeds in the presence of the catalyst, thereby forming a copolymer chain containing polysiloxane blocks and blocks of organic material.

3. A process according to claim 2 wherein the organic material is a polymer having a backbone of carbon—carbon bonds.

4. An emulsion of a silicone organic copolymer in water, wherein the copolymer comprises polydiorganosiloxane blocks and organic blocks and has a viscosity in the range 10 to 1000000 Pa.s and a mean particle size of 0.3 to 1000 micrometers, wherein the organic blocks are derived from an alpha-omega diene having 6 to 30 carbon atoms.

5. An emulsion of a silicone organic block copolymer in water prepared by the process of claim 1.

6. A process according to claim 1, wherein the organic material is an alpha, omega-diene having 6 to 30 carbon atoms.

7. A process according to claim 1 wherein the catalyst is a $Pt^{iv}$ compound.

8. A process according to claim 3, wherein the polymer is polyisobutylene.

9. An emulsion of a silicone organic block copolymer in water prepared by the process of claim 1.

* * * * *